GEORGE A. McLEAN
*INVENTOR.*

BY Lawrence J. Winter
ATTORNEY

June 30, 1959 G. A. McLEAN 2,892,919
APPARATUS FOR MAKING A FILTER ELEMENT
Filed May 15, 1957 6 Sheets-Sheet 2

GEORGE A. McLEAN
*INVENTOR.*
BY Lawrence J. Winter
ATTORNEY

June 30, 1959 G. A. McLEAN 2,892,919
APPARATUS FOR MAKING A FILTER ELEMENT
Filed May 15, 1957 6 Sheets-Sheet 3

GEORGE A. McLEAN
*INVENTOR.*

BY Lawrence J. Winter

ATTORNEY

June 30, 1959  G. A. McLEAN  2,892,919
APPARATUS FOR MAKING A FILTER ELEMENT
Filed May 15, 1957  6 Sheets-Sheet 4

GEORGE A. McLEAN
*INVENTOR.*

BY Lawrence J. Winter
ATTORNEY

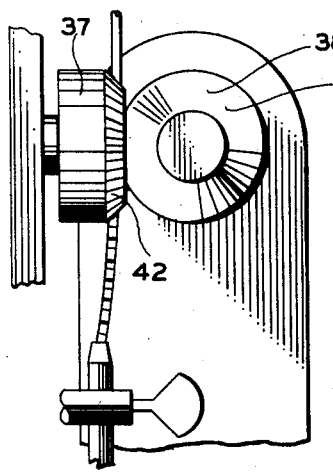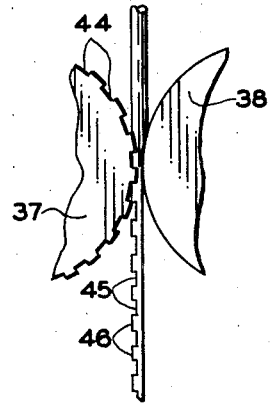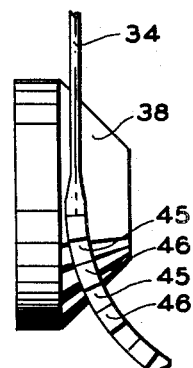
FIG. 9  FIG. 10  FIG. 11
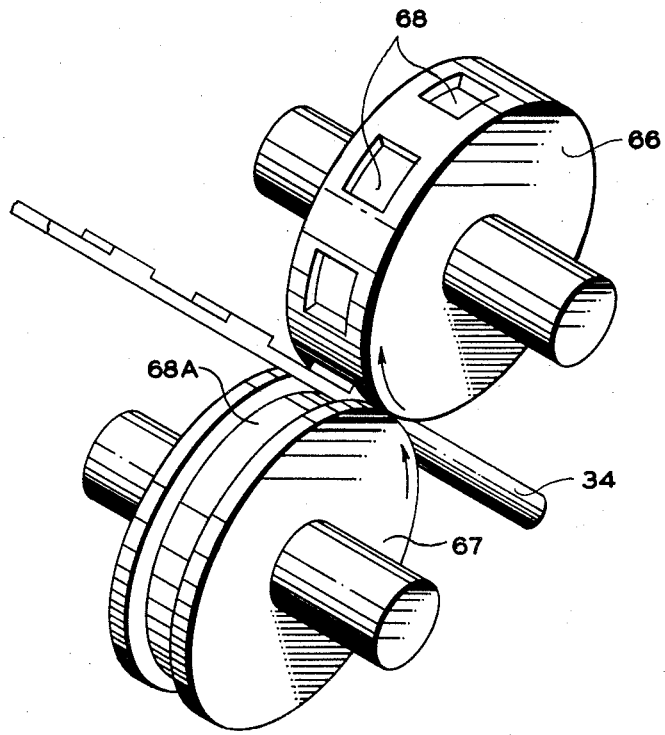
FIG. 12
GEORGE A. McLEAN
*INVENTOR.*
BY Lawrence J. Winter
ATTORNEY June 30, 1959  G. A. McLEAN  2,892,919
APPARATUS FOR MAKING A FILTER ELEMENT
Filed May 15, 1957  6 Sheets-Sheet 6

GEORGE A. McLEAN
*INVENTOR.*
BY Lawrence J. Winter
ATTORNEY

United States Patent Office 2,892,919
Patented June 30, 1959

2,892,919

APPARATUS FOR MAKING A FILTER ELEMENT

George A. McLean, Westfield, N.J., assignor to Purolator Products, Inc., Rahway, N.J., a corporation of Delaware Application May 15, 1957, Serial No. 659,276

7 Claims. (Cl. 219—78)

The present invention relates to a filter element, and more particularly to an apparatus for making a filter element.

The principal object of the present invention is to provide an apparatus for making an edge type filter that is self-supporting and does not require a supporting frame.

A further object of the present invention is to provide an automatic apparatus for making an edge type filter that unwinds a continuous coil of straight round metal ribbon of minute thickness, passes it through crimping means which convert the round wire into a thin flat ribbon of predetermined curvature and shape and impresses projections of predetermined height and width on one face of the ribbon, helically winds the ribbon upon a mandrel with the projections of one ring or turn of the ribbon in contact with the adjacent turn of ribbon, and welds each projection on one turn of metal ribbon to the adjacent turn to provide a metal edge type filter element with minute filtering interstices.

The invention will be better understood from the following description when considered in connection with the accompanying drawings forming a part thereof and in which:

Figs. 9, 10, 11 are enlarged detail views showing the crimping means embodied in the apparatus of Fig. 1; and Fig. 12 is an enlarged fragmentary isometric view showing the crimping means embodied in the apparatus illustrated in Fig. 5;

Figures 1, 2:
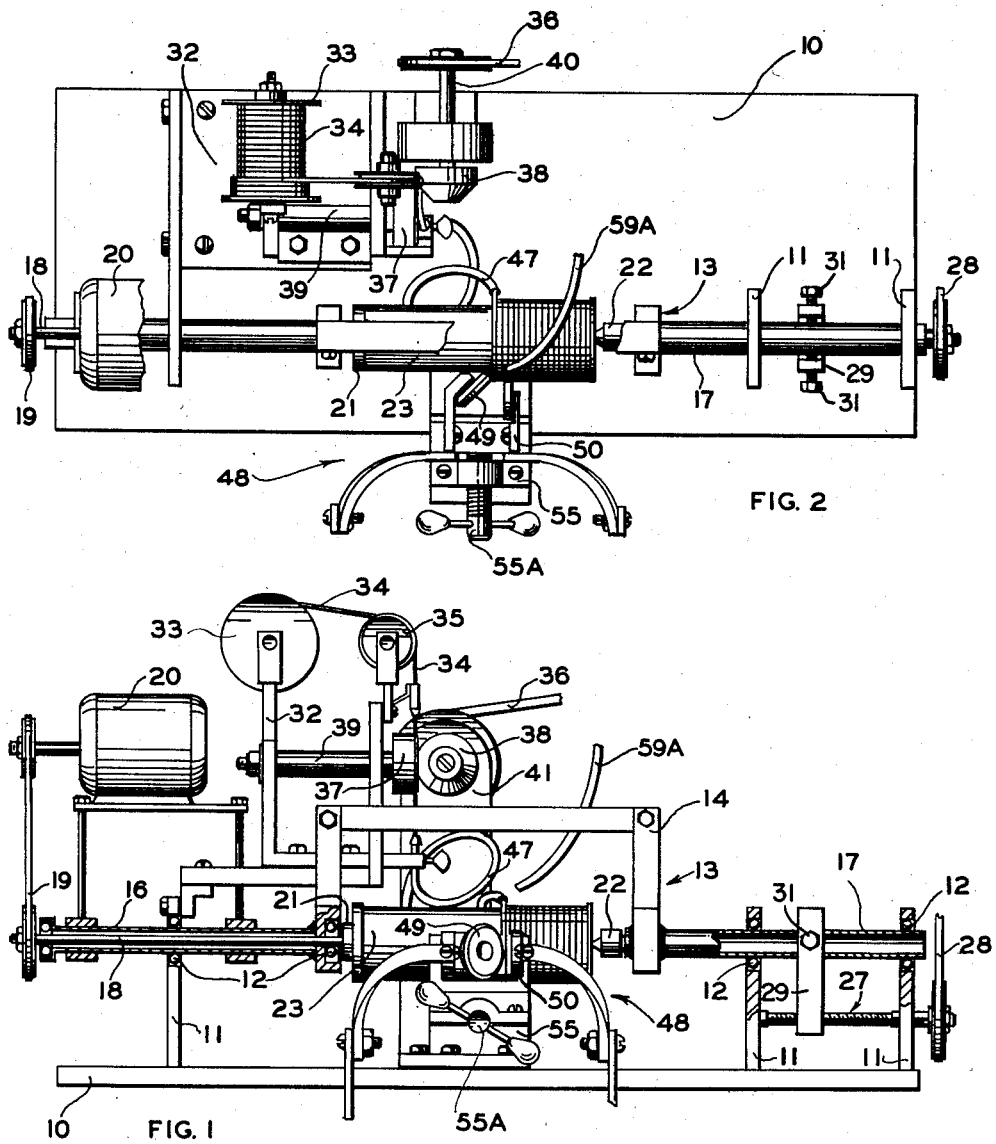
Fig. 1 is a side elevation, partly in section, of one form of the apparatus embodying the present invention.
Fig. 2 is a plan view of the apparatus shown in Fig. 1, with portions thereof removed for purposes of clarity.

Referring to Figs. 1 and 2, the reference number 10 designates a bed or base provided with a plurality of vertical supports or frames 11 provided with ball bearings 12 which carry a mandrel frame 13. The mandrel frame 13 comprises a U-shaped central section 14 and hollow cylindrical end sections 16 and 17 carried by the bearings 12 in frames 11 to permit lateral movement of frame 13 relative to frames 11. Frame section 16 is provided with a rotatable shaft 18 extending therethrough and connected to a belt drive 19 driven by a motor 20 mounted on section 16 for axial movement with the section, as hereinafter described. A head stock 21 is provided on the end of shaft 18 adjacent the U-shaped section of frame 13. Hollow cylindrical section 17 is provided with a tail stock 22 mounted therein adjacent the U-shaped section of frame 13. A cylindrical mandrel 23 adapted to be rotated by shaft 18 is carried between head stock 21 and tail stock 22 for winding a metal ribbon thereupon, as hereinafter described.

A screw feed drive 27 is mounted on frame 11 adjacent section 17 of mandrel frame 13 and is connected to a belt drive 28 for sliding or moving frame 13, mandrel 23, and motor 20 laterally of the bed 10 and frames 11. The movement of screw drive 27 is transmitted to mandrel 23 through a clamp member 29 having one end threaded on screw drive 27 and the other end thereof connected to section 17 of mandrel frame 13 by bolts 31.

An upper frame 32 is positioned over frame 11 adjacent section 16 and is provided with a spool 33 on which is wound a preformed roll of plain round metal ribbon 34. Ribbon 34 is fed through a pulley 35 carried on the opposite end of frame 32 and passes between driven and driving rollers 37 and 38 respectively, mounted on shafts 39 and 40 respectively. Roller 37 is freely rotatable on shaft 39 which is mounted on frame 32, while roller 38 is fixedly connected to shaft 40 which is mounted on a frame 41.

Rollers 37 and 38 have co-acting conical surfaces 42 and 43 respectively (see Figs. 9 to 11). The conical surface 42 of roller 37 is provided with a plurality of radial slots 44 therein which converts the round ribbon into a thin flat ribbon of definite predetermined curvature and impresses into the metal ribbon passing therebetween a plurality of spaced grooves 45 so as to form projections or teeth 46 on the ribbon. Roller 38 and shaft 40 are driven by belt means 36 so as to pull the round metal ribbon between the rollers on its way toward the cylindrical mandrel 23. Thereafter, the flat metal ribbon 34 is fed through a curved guide tube 47 mounted on frame 32 and wound upon the tail stock end of cylindrical mandrel 23.

Figure 3:
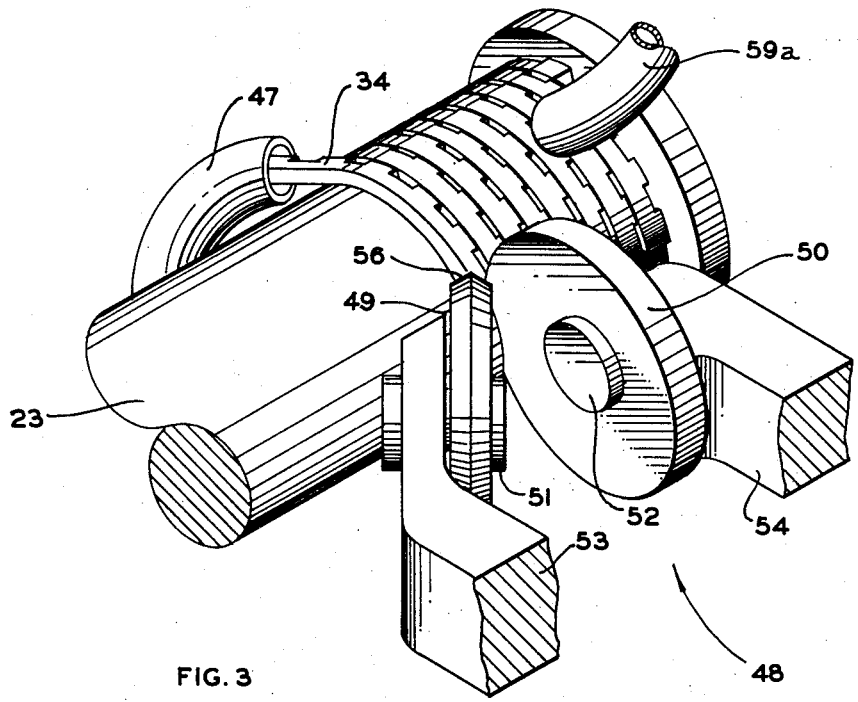
Fig. 3 is an enlarged isometric fragmentary view showing details of the welding means embodied in the apparatus.
Figure 4:
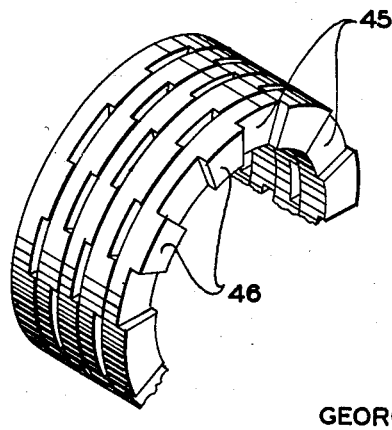
Fig. 4 is an enlarged isometric fragmentary view showing a filter element made by the apparatus embodied in the present invention.
Figure 13:
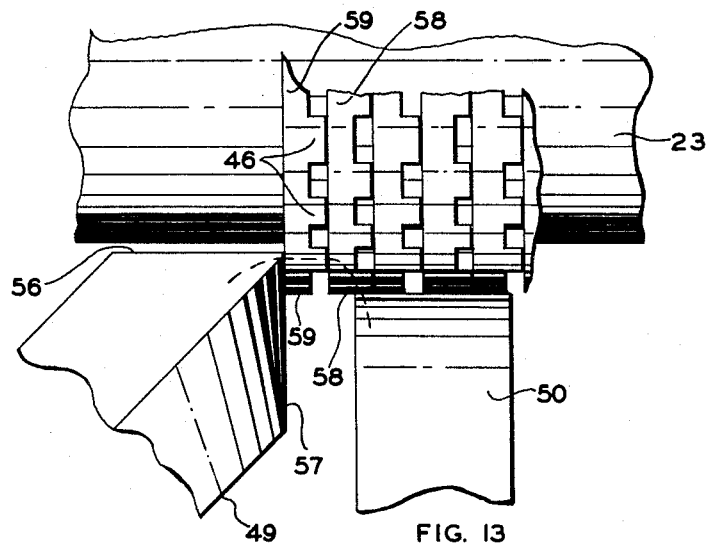
Fig. 13 is an enlarged fragmentary view showing the welding electrodes embodied in the apparatus of Fig. 1.

Welding means 48 are provided for welding projections 46 of one metal ribbon turn wound upon mandrel 23, to the next adjacent metal ribbon turn wound thereon. The welding means comprises electrode wheels 49 and 50 freely mounted on stub shafts 51 and 52 (see Fig. 3) respectively, carried in support arms 53 and 54 respectively, of a screw feed mechanism 55 (Figs. 1 and 2) supported on bed 10 and having a feed screw 55a thereon for feeding the electrodes toward and away from the cylindrical mandrel 23. Electrode 50 (see Figs. 3 and 13) is a circular wheel positioned on support member 54 with its circumference extending parallel to mandrel 23 and abutting the outer faces of the turns of metal ribbon 34 wound thereon. Electrode wheel 49 (see Figs. 3 and 13) comprises a circular disc or wheel having its circumference bevelled or tapered to form faces or surfaces 56 and 57. Wheel 49 is disposed on support member 53 so that face 56 (see Fig. 13) extends parallel to mandrel 23 and face 57 is parallel to and abuts the side face of the last turn 59 of the metal ribbon wound upon the cylindrical mandrel 23. Thus, during the welding operation electrode wheel 50 presses against the outer face of the next to the last turn 58 of metal ribbon 34 wound upon the mandrel, while face 57 of electrode wheel 49 presses against the advancing side face of the last turn 59 of metal ribbon 34 wound upon the mandrel. An electric current supplied from a source not shown is then passed through wheel 49 (as indicated by dotted lines in Fig. 13) and flows along a path into turn 59 of metal ribbon 34, through projection 46 thereon and into the adjacent turn 58 of the metal ribbon into the electrode wheel 50 to spotweld projections 46 of turn 59 to turn 58 of the metal ribbon. At the same time, the electrode wheel 49 applies a continuous pressure of approximately 8 to 14 pounds to each new advancing turn of metal ribbon 34 as it is wound upon the rotating mandrel 23 in order to keep it in place and press it against the prior turn 27 of metal ribbon. Feed drive 27 slides or moves frame 13 and mandrel 23 laterally of bed 10 and frames 11, to the right looking at Figs. 1 and 2, as the wire is wound on mandrel 23 to maintain the advancing wire in alignment with the electrodes in order to continuously weld the projections of one turn to the adjacent turn. Water may be supplied to cool the ribbon during the welding operation through water tube 59a.

Figure 6:
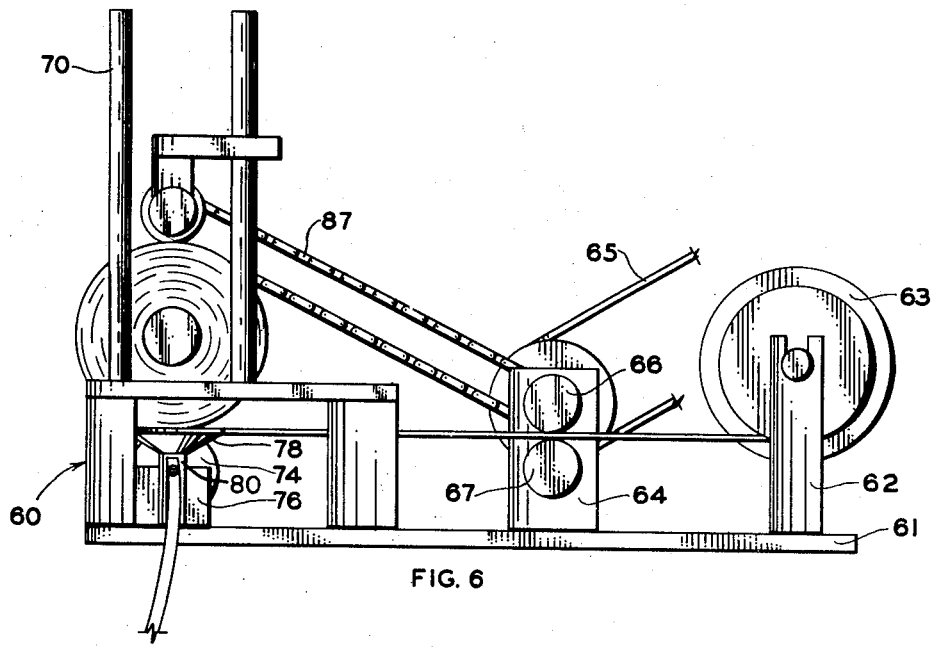
Fig. 6 is a side elevation of the apparatus of Fig. 5.
Figure 5:
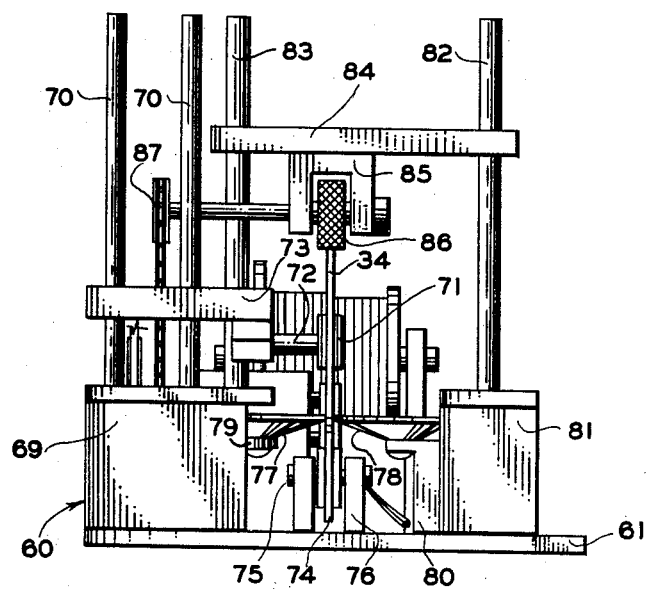
Fig. 5 is a front elevation of a modified embodiment of the apparatus shown in Fig. 1.

Referring to the embodiment of the invention shown in Figs. 5 and 6, the reference numeral 60 generally designates a machine for making a flat or pan-cake type metal edge filter from a continuous metal ribbon. A bed or base 61 is provided having a vertical frame 62 thereon which supports a spool 63 of the continuous round wire metal ribbon. Disposed adjacent spool frame 62 is a gear box 64 containing a gear reduction mechanism therein, not forming a part of the invention, driven by a belt pulley drive 65 on one side thereof and connected to crimping rollers 66 and 67 on the opposite side thereof which it drives. The metallic ribbon 34 is fed from spool 63 between the cooperating rollers to impress projections 46 thereon and to convert the round wire into a thin flat ribbon.

Referring to Fig. 12, roller 66 comprises a cylindrical disc having spaced recesses or depressions 68 in the circumference thereof, while roller 67 comprises a cylindrical disc having a circumferential recess or groove 68a therein. The forming and shaping of metal ribbon 34 into a flat ribbon with projections 46 thereon is accomplished by feeding the leading end of the ribbon between the rollers. Thereafter, the rotation of the rollers in opposite directions by belt drive 65 through the gear reduction mechanism exerts a constant pull on the remaining portion of the ribbon to pull it therebetween.

A support frame 69 is disposed on the other end of bed 61 from spool frame 62 provided with vertical posts or shafts 70 extending thereabove for supporting a cylindrical mandrel 71 mounted on a freely rotatable horizontal shaft 72 carried by a member 73 slidably mounted on shafts 70. Mandrel 71 is positioned above and in direct alignment with a vertical electrode wheel or disc 74 mounted on a stub shaft 75 which is freely carried in a frame 76 disposed on the bed 61. Freely rotatable horizontal electrode wheels or discs 77 and 78 are carried by box-like frames 79 and 80 respectively positioned on opposite sides of electrode wheel 74 so as to weld the projections 46 on one turn of ribbon 34 to the prior turn of ribbon as the ribbon is wound on mandrel 71 after it has been passed between rollers 66 and 67, as hereinafter described.

A frame 81 is disposed on bed 61 adjacent roller 78 for supporting a vertical tie rod or shaft 82 connected through cross bar 84 to a similar shaft 83 supported on a frame 69. Cross bar 84 is mounted on rods 82 and 83 so as to slide or move freely in a vertical direction thereon. A yoke 85 is mounted on the underside of cross bar 84 intermediate the ends thereof and carries a cylindrical knurling member 86 therein rotated by a sprocket chain drive 87 connected to belt drive 65 which also drives forming rollers 66 and 67. Knurling member 86 is adapted to press against the turns of ribbon being wound upon mandrel 71 and provides a positive drive for winding the metal ribbon 34 thereupon.

Figure 7:
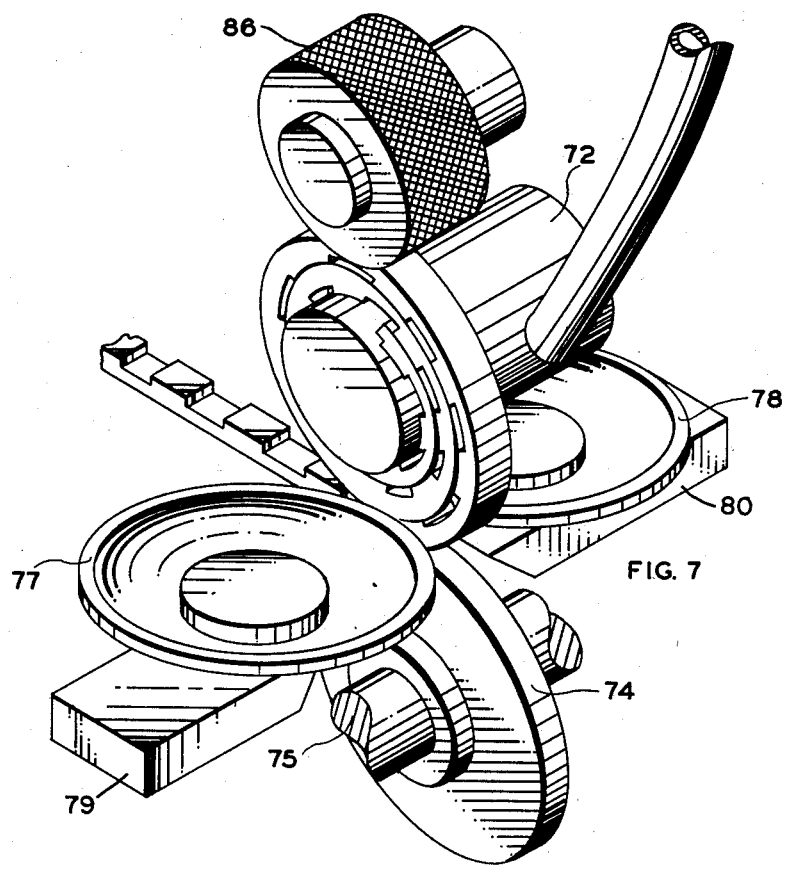
Fig. 7 is an enlarged isometric fragmentary view showing the details of the welding means embodied in the apparatus of Fig. 3.
Figure 8:
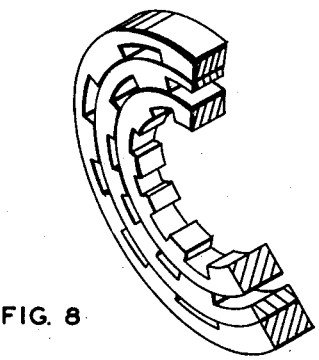
Fig. 8 is an isometric fragmentary view showing a filter element made by the apparatus in Fig. 5.
Figure 14:
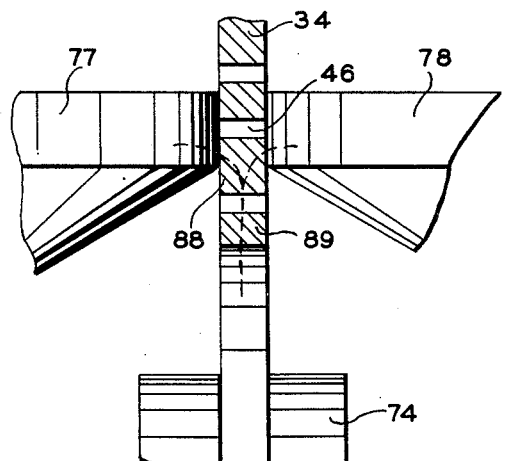
Fig. 14 is an enlarged fragmentary view illustrating the welding electrodes embodied in the apparatus shown in Fig. 5.

In operation, to manufacture a filter element by machine 60 of the present invention, a spool 63 of round metal ribbon 34 is placed on frame 62 and the leading edge of the metal ribbon 34 is inserted between cooperating rollers 66 and 67. Thereafter, pulley drive 65 through the gear reduction mechanism (not shown) in gear box 64 rotates rollers 66 and 67 in opposite directions so as to continuously pull the ribbon therebetween. In passing between the rollers, the wire ribbon is converted into a flat ribbon with spaced projections by cooperating rollers 66 and 67, as shown in Fig. 12. The leading end of the formed ribbon is then placed between the freely rotating mandrel 71 (see Fig. 7) and the driven knurling member 86 which exerts a continuous force or pull against the surface thereof to wind it on the mandrel. The weight of cross bar 84 and yoke 85 maintains knurling member 86 in contact with the metal ribbon as it is advanced on the mandrel 71 and enables the knurling member to obtain a sufficient frictional grip on the metal ribbon to keep winding it thereon. As the leading edge of the ribbon is advanced on the mandrel, the side walls thereof pass into contact with electrode wheels 77 and 78 (see Fig. 14) while the outer wall thereof makes contact with electrode wheel 74. As the following turn 89 of ribbon is wound upon the mandrel forming a second turn of larger diameter than the previous turn 88 wound thereon, the wall of this turn comes in contact with electrode wheel 74 so that both turns are now simultaneously positioned to permit welding of projections 46 on the subsequent wound turn to the prior wound turn of ribbon. Current is then flowed from a source not shown through electrode 74 (see Fig. 14) and passes through projections 46 on the last turn wound on the mandrel into the prior wound turn, as indicated by dotted lines in Fig. 14 and into electrode wheels 77 and 78 thus welding projections 46 to the surface of the adjacent turn to form a metal edge pan-cake type filter element. As the diameter of the element progressively increases due to the increased number of ribbon turns wound thereon, knurling member 86 and cross bar 84 slide upwardly on shafts 83 and 82 while mandrel 72 and its carrying member 73 ride upwardly on shafts 70 thus automatically adjusting the apparatus to suit the varying conditions. When the filter element attains the desired size, the finished element is merely removed from the apparatus and the machine is ready to manufacture another element.

Inasmuch as various changes may be made in the form, location and relative arrangement of the several parts without departing from the essential characteristics of the invention, it will be understood that the invention is not to be limited except by the scope of the appended claims.

What is claimed is:

1. An apparatus for making a filter element comprising means for forming spaced projections of predetermined dimensions on a continuous metal wire, a rotatable mandrel for winding said formed wire thereon, and means for welding the projections on the last turn of wire wound upon said mandrel to the prior turn of wire wound thereon comprising a feed electrode positioned to engage said last turn wound upon said mandrel and a ground electrode positioned to engage said prior turn wound thereon, said feed and ground electrodes comprising rotatable circular discs, said feed electrode being disposed to engage the face of said last turn opposite said projections and said ground electrode being disposed to engage the face of said prior turn adjacent said projections.

2. An apparatus for making a filter element comprising cooperating roller means for forming spaced projections on a wire fed therebetween, a rotatable cylindrical mandrel for helically winding said formed wire thereon, and welding means positioned adjacent said mandrel for welding the projections of one turn of wire wound on said mandrel to the adjacent turn of wire wound thereon, said welding means comprising a rotatable circular feed electrode in contact with the last turn of wire wound on said mandrel, and another rotatable circular ground electrode in contact with the prior turn of wire wound thereon, and means for moving said mandrel laterally of said electrodes as said wire turns are wound on the mandrel.

3. An apparatus for making a metal edge type filter element comprising cooperating roller means for forming a flat ribbon with spaced projections thereon from a round wire fed therebetween, a rotatable cylindrical mandrel for helically winding said ribbon thereon, circular feed and ground electrodes disposed adjacent said mandrel for welding the last turn of ribbon wound upon said mandrel to the prior turn wound thereon, said feed electrode being disposed diagonally of said mandrel and having a circumferential face parallel to said mandrel and another face parallel to and in contact with the side face of said last ribbon turn, said ground electrode having its circumferential face parallel to and in contact with the outer periphery of said prior ribbon turn, feed means for moving said electrodes toward and away from said mandrel, and other feed means for sliding said mandrel laterally of said electrodes as said wire turns are wound thereon.

4. An apparatus for making a metal edge type filter element comprising means for forming spaced projections on a metal wire, a mandrel for winding said wire thereon, a friction member disposed adjacent said mandrel to press against said wire to wind it upon the mandrel, and means for welding the projections on the last turn of wire wound upon said mandrel to the adjacent wire turn wound thereon comprising feed and ground electrodes consisting of circular discs freely mounted on support means, said feed electrode positioned to press against the outer periphery of the last turn of wire wound on said mandrel, and ground electrodes disposed to press against opposite side faces of the adjacent turn of wire wound thereon.

5. The apparatus of claim 4 wherein said feed and ground electrodes are circular discs freely mounted on support means.

6. The apparatus of claim 4 wherein said friction member is mounted on a vertically slidable support means.

7. The apparatus of claim 4 wherein said mandrel comprises a circular disc mounted on vertically slidable support means.

References Cited in the file of this patent

UNITED STATES PATENTS

| | | |
|---|---|---|
| 486,624 | Burton et al. | Nov. 22, 1892 |
| 1,712,507 | Lawson | May 14, 1929 |
| 1,865,845 | Dyer | July 5, 1932 |
| 2,016,414 | Cramer | Oct. 8, 1935 |
| 2,433,966 | Von Keuren | Jan. 6, 1948 |